M. J. DIXON & W. TUNSTILL.
Ice-Crushers.

No. 140,019.          Patented June 17, 1873.

Witnesses              Inventors

Chas. H. Smith         Michael J. Dixon.
Geo. T. Pinckney       William Tunstill.

per L. W. Serrell Atty.

AM. PHOTO-LITHOGRAPHIC CO. N.Y. (OSBORNE'S PROCESS.)

UNITED STATES PATENT OFFICE.

MICHAEL J. DIXON, OF NEW YORK, AND WILLIAM TUNSTILL, OF BROOKLYN, E. D., NEW YORK.

IMPROVEMENT IN ICE-CRUSHERS.

Specification forming part of Letters Patent No. 140,019, dated June 17, 1873; application filed May 20, 1873.

*To all whom it may concern:*

Be it known that we, MICHAEL J. DIXON, of the city and State of New York, and WILLIAM TUNSTILL, of Brooklyn, E. D., Kings county, State of New York, have invented an Improvement in Ice-Crushing Machines, of which the following is a specification:

Ice-crushing machines have been made with stationary and moving jaws actuated by cams and eccentrics, the object being to crush the ice sufficiently fine for freezing ice-cream, &c.

Our invention is made with reference to operating upon large cakes of ice, to split, crack, and crush the ice into small pieces, and deliver the same upon a floor or into a hopper, ready for use in freezing cream, &c. We supply the cakes of ice upon an incline, down which each cake slides with increasing velocity, and is arrested by splitting-blades on the far side of the hopper, so that the ice is cracked and falls into the hopper. One side of the hopper is made to swing by the action of connecting-rods and a crank, and the jaws of the hopper are provided with teeth to crack and break the ice. The stationary jaw is held in position when adjusted by means of notched or rack bars. The ice falls away freely from the bottom of the hopper into any suitable receptacle; but when, for convenience, the machine is placed upon a floor or platform, a delivery-plunger is employed to convey the ice away horizontally from below the hopper and deliver it to a pile adjacent to the machine.

Figure 1:
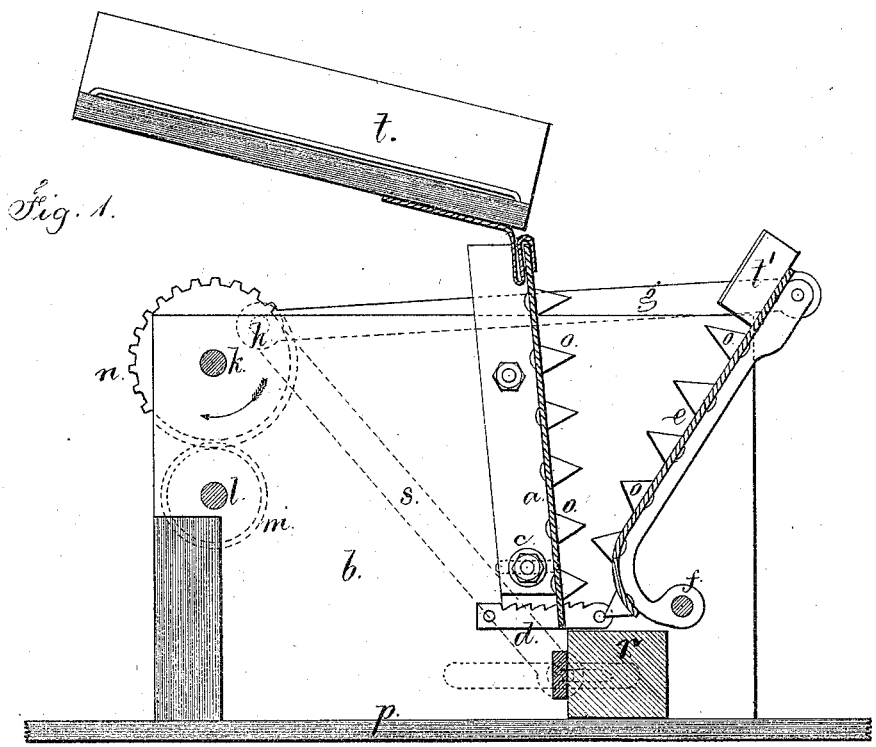
Figure 2:
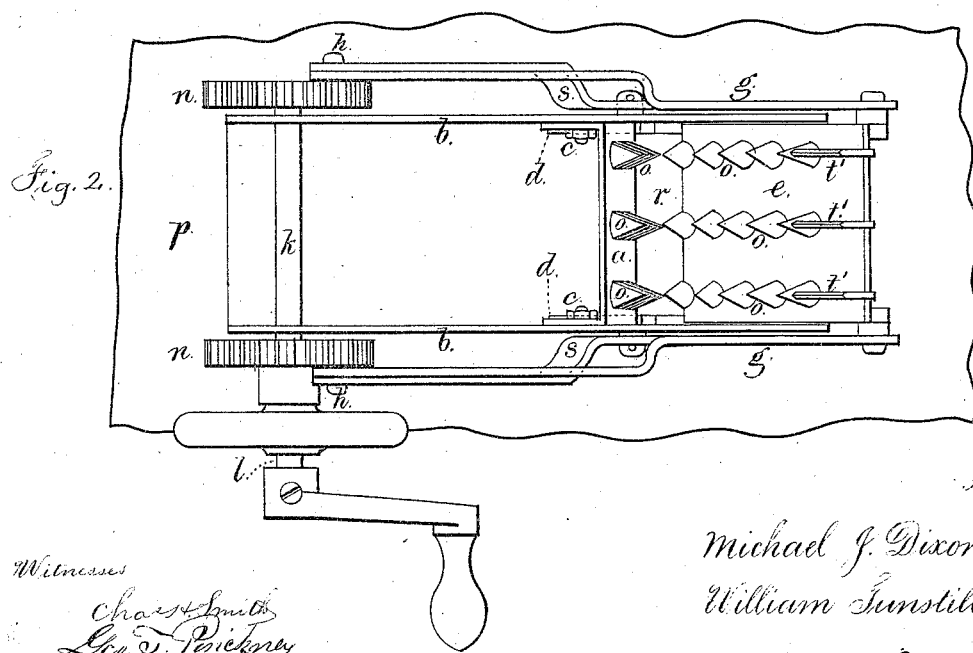

In the drawing, Figure 1 is a vertical section of the machine, and Fig. 2 is a plan of the same.

The jaw $a$ is between two plates, $b$, and is attached to them by bolts $c$, and at the lower ends of the jaw $a$ there are projections entering the teeth of the rack-bars $d$ so as to hold the same firmly after the jaw has been adjusted in position to suit the desired size of pieces into which the ice is to be crushed. The jaw $e$ is made to swing upon the cross-bar $f$, and it is moved by the connecting-rods $g$ that extend to the crank-pins $h$ of the shaft $k$. This shaft $k$ is revolved by competent power. We have shown the shaft $l$, pinions $m$, and wheels $n$, for this purpose. By employing the connecting-rods $g$ that act by tension upon the upper angles of the jaw $e$, the machine can be made comparatively light and be operated with but little friction. The faces of the jaws $a$ and $e$ are armed with teeth $o$; it is preferable to make them conical, and screw them into the metallic jaw-plates so as to be movable in case of injury to any one, and by curving the lower portion of the moving jaw, as shown, the ice will be caught more easily when the jaws are open, and the crushed ice escape freely downwardly. The teeth $o$ may be cast with and upon the respective jaws.

To deliver the ice from the platform $p$, below the hopper, we employ the reciprocating plunger $r$ that moves back and forth beneath the lower end of the hopper; said plunger is moved by connecting the rods $s$ to the cranks $h$, and the ice which falls freely from the hopper upon the floor $p$ is conveyed away immediately by such plunger to the heap of ice upon the floor near the machine, or into any suitable receptacle. The inclined chute $t$ conveys the blocks of ice to the machine, and their velocity becoming accelerated, renders it difficult to stop such blocks without risk of injury to the stopping device; we therefore make use of splitting-blades $t'$ upon the jaw $e$, or above the hopper, against which the ice expends its inertia; in so doing the ice is split and cracked, and the knives themselves are not liable to injury because they penetrate the ice, stopping its momentum gradually. The broken ice falls into the hopper and is crushed.

We claim as our invention—

1. The jaw $a$ supported at its lower edges by the rack-bars $d$, and connected to the sides $b$ by bolts, as set forth.

2. The arrangement of the connecting-rods $g$ $g$, cranks $h$ $h$, shaft $f$, and swinging jaw $e$, in combination with the stationary jaw $a$, between the plates $b$ $b$, as and for the purposes set forth.

3. The delivery-plunger $r$ moving horizontally, or nearly so, beneath and in combination with the ice-crushing jaws $a$ $e$, substantially as set forth.

4. The splitting-blades or projections $t'$, in combination with the supply-chute $t$, and ice-crushing jaws $a$ and $e$, substantially as and for the purposes set forth.

Signed by us this 12th day of May A. D. 1873.

MICHAEL J. DIXON.
WILLIAM TUNSTILL.

Witnesses:
GEO. T. PINCKNEY,
CHAS. H. SMITH.